United States Patent [19]
Ueda

[11] Patent Number: 5,594,599
[45] Date of Patent: Jan. 14, 1997

[54] APPARATUS FOR VERIFYING OPERATION OF A RECORDING AND REPRODUCING APPARATUS

[75] Inventor: Mamoru Ueda, Kanagawa, Japan

[73] Assignee: Sony Corporation, Tokyo, Japan

[21] Appl. No.: 220,176

[22] Filed: Mar. 30, 1994

[30]     Foreign Application Priority Data

Apr. 2, 1993  [JP]  Japan ................................ 5-100230

[51] Int. Cl.$^6$ ................................................. G11B 5/09
[52] U.S. Cl. ................................................. 360/53
[58] Field of Search ............................. 360/31, 32, 53; 358/335; 369/53, 59, 60

[56]              References Cited

U.S. PATENT DOCUMENTS

| | | | |
|---|---|---|---|
| 4,549,230 | 10/1985 | Odaka | 360/32 X |
| 5,309,290 | 5/1994 | Sugiyama et al. | 360/32 |
| 5,317,413 | 5/1994 | Yanagihara | 360/32 |

FOREIGN PATENT DOCUMENTS

| | | |
|---|---|---|
| 0364961A2 | 4/1990 | European Pat. Off. . |
| 3-8176 | 1/1991 | Japan . |

OTHER PUBLICATIONS

JP reference No. 3–8176, Chiba et al., English Translation, Jun. 1995.

Mee C. D. and Daniel E. D.: "Magnetic Recording Handbook (Technology and Applications)" 1990, McGraw–Hill, New York XP002003783 * p. 1137, paragraph 4 – p. 1138, paragraph 1; FIG. 8.6 *.

IEEE International Conference on Consumer Electronics, Jun. 5–7, 1991, Rosemont, Illinois, pp. 182–183, XP000288996 Onishi et al.: "An experimental home–use digital VCR with three dimensional DCT and superimposed error correction coding".

*Primary Examiner*—W. Chris Kim
*Attorney, Agent, or Firm*—William S. Frommer; Alvin Sinderbrand

[57]              ABSTRACT

Proper operation of a recording and reproducing apparatus is verified by comparing, after a suitable delay, error detection codes calculated for compressed data prior to being recorded on a medium with error detection codes calculated for the corresponding compressed data reproduced from the medium, thereby reducing the amount of delay memory needed to temporarily store the error detection codes calculated prior to recording of the data.

5 Claims, 5 Drawing Sheets

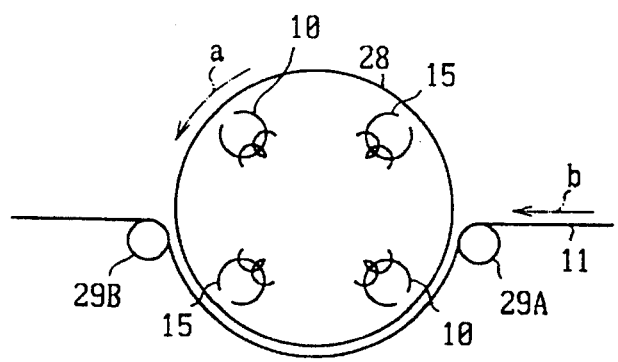
FIG. 2(RELATED ART)
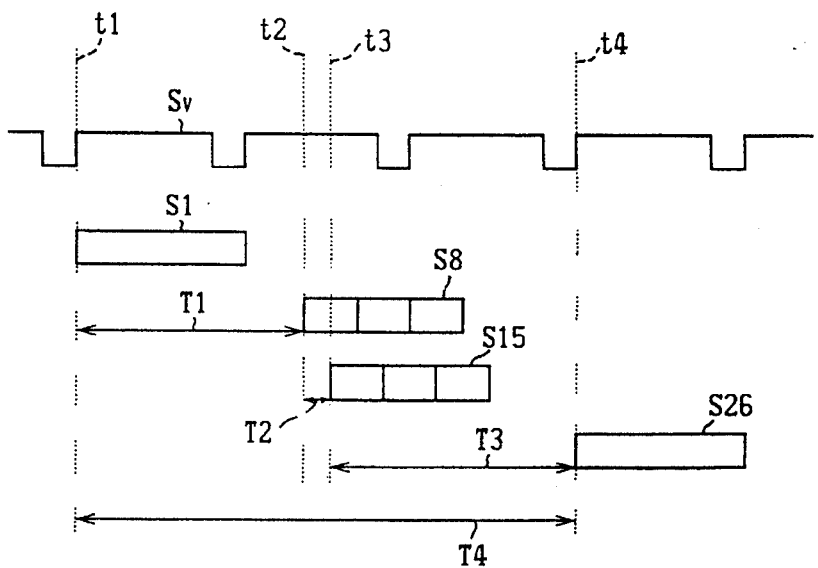
FIG. 3A (RELATED ART)
FIG. 3B (RELATED ART)
FIG. 3C (RELATED ART)
FIG. 3D (RELATED ART)
FIG. 3E (RELATED ART)

APPARATUS FOR VERIFYING OPERATION OF A RECORDING AND REPRODUCING APPARATUS

BACKGROUND OF THE INVENTION

1. Field of the Invention

This invention relates to a recording and reproducing apparatus, and is suitably applied to a recording and reproducing apparatus in which, for example, a recording error is detected when video data is recorded.

2. Description of the Related Art

As this kind of recording and reproducing apparatus, a digital video tape recorder (DVTR) shown in FIG. 1 has been produced. That is, in FIG. 1, 1 generally shows DVTR. An input digital video signal S1 inputted from a predetermined video signal generation unit is inputted to a shuffling circuit 2. The shuffling circuit 2 divides digital video data which is inputted as a digital video signal into discrete cosine transform (DCT) blocks of 8 columns by 4 rows for each field, and then gathers ten blocks of this DCT block from separate positions in the screen respectively, and transmits them to the following DCT transform circuit 3 as the shuffled data S2.

The DCT transform circuit 3 carries out discrete cosine transform on each DCT block data, and transmits this to the following quantization circuit 4 as a DCT data S3.

The quantization circuit 4 checks the quantization level for realizing the target rate of compression based on the data-length information which is fed back from a variable-length coding circuit 5, compresses the information volume by quantizing the DCT data S3 based on the quantization level, and then transmits this to the following variable-length coding circuit 5 as a quantized data S4. The variable-length coding circuit 5 variable-length codes the quantized data S4, generates a variable-length coded data S5 which is fixed a block-length in format, and transmits this to an error-correction outer-code circuit 6 and a delay memory 12.

An error correction outer-code is added in the error-correction outer-code circuit 6 for correcting errors generated in burst form, and moreover, in the following error-correction inner-code circuit 7, an error correction inner-code for correcting a random error, synchronous pattern, ID code, etc., are added. Then, the 8-bit parallel data is converted into the 1-bit serial data with a clock frequency 8 times that of the parallel data, and transmitted to a recording circuit 8 to generate a recording data S8. A recording current is applied to a recording head 10 mounted on a rotary drum through a rotary transformer 9, and the recording data S8 is recorded on a magnetic tape 11.

As shown in FIG. 2, in the rotary drum 28, a pair of reproducing heads 15 are mounted apart from a pair of recording heads 10 by 90 degrees, respectively. This rotary drum 28 is rotated in the direction shown by the arrow "a" while the magnetic tape 11 guided by an entrance tape guide 29A and an exit tape guide 29B, travels in the direction shown by the arrow "b", so that the magnetic tape 11 can slide on the side where the recording head 10 and the reproducing head 15 of the rotary drum 28 are arranged.

Moreover, in the reproducing system, recording and reproducing can be carried out simultaneously by immediately reproducing the recording data S8, which is recorded on the magnetic tape 11, with the reproducing head 15. That is, the reproduced data S15 which is obtained through the reproducing head 15 is inputted to a PLL circuit 18 through a rotary transformer 16 and a reproduction equalizer 17. After the clock is reproduced, the block synchronous pattern is reproduced to return the 1-bit serial data to 8-bit parallel data with a clock frequency ⅛ times in the following synchronous (SYNC) detection circuit 19, and this is transmitted to the following inner-code correction circuit 20.

In the inner-code correction circuit 20, random errors are corrected using inner-codes, and in the following outer-code correction circuit 21, burst errors are corrected using outer-codes. Then the corrected data S21 which is outputted from the outer-code correction circuit 21 is transmitted to a record assurance comparator 13 and a variable-length decoding circuit 22.

In the variable-length decoding circuit 22, variable-length decoded data S22 is obtained from the corrected data S21, and this is transmitted to a inverse quantization circuit 23 in order to carry out an inverse quantization processing. The inverse quantized data S23 is transmitted to an inverse discrete cosine transform (IDCT) circuit 24 to carry out an inverse discrete cosine transform processing corresponding to the discrete cosine transform which was conducted in the DCT transform circuit 3. The IDCT data S24 obtained in this way is transmitted to the following deshuffling circuit 25 to arrange the DCT block data in scan order, and transmitted as the deshuffled data S25 to an error correction circuit 26. If an error which exceeds the error correction limit of the error correction codes is generated, the error is corrected in the error correction circuit 26, thereby a reproduction digital video signal S26 is obtained.

FIGS. 3A to 3E show timing diagrams of the signal processing in the DVTR1. The input digital video signal S1 which is inputted for each field synchronizing at time point t1 with a vertical synchronizing signal $S_V$ (FIG. 3A), is recorded as recording data S8 (FIG. 3C) at time point t2 which is delayed for the delay period T1 of 1+⅓ fields as the signal processing time in the shuffling circuit 2, the DCT transform circuit 3, the quantization circuit 4, the variable-length coding circuit 5, the error-correction outer-coding circuit 6, the error-correction inner-coding circuit 7, and the recording circuit 8.

On the other hand, since a pair of reproducing heads 15 are mounted apart from a pair of recording heads 10 by 90 degrees respectively in the rotary drum 28, the reproduced data S15 which is obtained through the reproducing head 15 at the simultaneous recording and reproducing operation, is outputted from the reproducing head 15 at a time point t3 which is delayed from the recording data S8 for the delay period T2 of ⅙ fields, as shown in FIG. 3D.

Moreover, the reproduction digital video signal S26 which is outputted from the error correction circuit 26, is outputted at a time point t4 which is delayed from the output time point t3 of the reproduced data S15 for the delay period T3 of 1+½ fields as a signal processing time in the reproducing system. It means that the output video signal S26 is delayed from the time point t1 where the input digital video signal S1 is inputted to the recording system for the delay period T4 of 3 fields, and outputted from the reproducing system.

In this way, in the DVTR1, the data is delayed for the portion of signal processing time in each signal processing circuit in the recording system and the reproducing system. Therefore, the variable-length coded data S5 which is outputted from the variable-length coding circuit 5 to the delay memory 12 is delayed in the delay memory 12 for the portion of delay time required for signal processing from the error-correction outer-coding circuit 6 in the recording system to the outer-code correction circuit 21 in the reproducing system, and transmitted to a record assurance comparator 13.

Therefore, the record assurance comparator 13 inputs the variable-length coded data S5 outputted from the variable-length coding circuit 5, together with the corrected data S21 in which this variable-length coded data S5 is recorded and reproduced simultaneously to/from the magnetic tape 11 and outputted from the outer-code correction circuit 21, and compares the variable-length coded data S5 with the corrected data S21. Here, if the recording and reproducing systems operate normally and an error which exceeds the error correction limit of the error correction codes is not generated in the corrected data S21, the variable-length coded data S5 and the corrected data S21 will be the same.

Therefore, comparing the variable-length coded data S5 with the corrected data S21 one by one, the record assurance comparator 13 can carry out the recording assurance, such as the states of the operations in the recording and reproducing systems are checked, and if no abnormality occurs in the result of the check, the recording operation is continued.

In such a construction having the DVTR1, a memory element is needed for several fields as the delay memory 13. For example, a memory having a large capacity of about 5 [Mbit] is needed for the portion of 3 fields.

Moreover, the number of circuit elements as well as the circuit board area is increased because high-speed writing and reading of the memory having a large capacity is required, and the number of high-speed memory elements and the power consumption increases due to the high-speed operation. Furthermore, there was a problem of being unable to avoid wire breakage, etc., because a number of elements were connected with a number of wires.

SUMMARY OF THE INVENTION

In view of foregoing, an object of this invention is to provide a recording and reproducing apparatus which can make a delay memory of yet smaller capacity.

The foregoing object and other objects of this invention have been achieved by the provision of a recording and reproducing apparatus, in which a recording data S5 is inputted to predetermined recording and reproducing means 6, 7, 10, 11, 15, 20, and 21 and outputted as a reproduced data S21, as well as the recording and reproducing apparatus 30, which detects an error of the reproduced data S21 by comparing the recording data S5, which is delayed for the portion of the processing time in the recording and reproducing means 6, 7, 10, 11, 15, 20, and 21, with the reproduced data S21, comprising: an error detection code calculation means 31 for calculating the error detection code S31 based on the recording data S5; a delay memory 32 for delaying the error detection code S31 which is output from the error detection code calculation means 31 for the portion of the processing time in the recording and reproducing means 6, 7, 10, 11, 15, 20, and 21; and a comparison means 33 for comparing the error detection code S31 which is output from the delay memory 32 with the error detection code which is calculated based on the reproduced data S21.

Furthermore, in this invention, the recording data S5 consists of the data in which a predetermined input data S1 is variable-length coded.

The capacity of the delay memory 32 can be made considerably smaller by inputting the recording data S5 having a large amount of information volume into a delay memory 32 and replacing it with the error detection code S31 having less information volume in the error detection code calculation means 31.

According to this invention, the recording data is inputted to a predetermined recording and reproducing means, and in the recording and reproducing apparatus which outputs as reproduced data, when record assurance is conducted by comparing the recording data with the reproduced data, an error detection code is calculated for the recording data, and the error detection code is compared with the error detection code which is obtained from the reproduced data by a predetermined comparison means, thereby the amount of information transmitted from the recording system to the comparison means can be considerably reduced. Therefore, the capacity of the delay memory for delaying the error detection code which is calculated from the recording data for the portion of the processing time in the recording and reproducing means can be considerably reduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings;

FIG. 2 is a schematic diagram illustrating the configuration of a rotary drum;

FIGS. 3A to 3E are signal waveform diagrams explaining the signal processing of the recording and reproducing apparatus;

DETAILED DESCRIPTION OF THE EMBODIMENT

Figure 1:
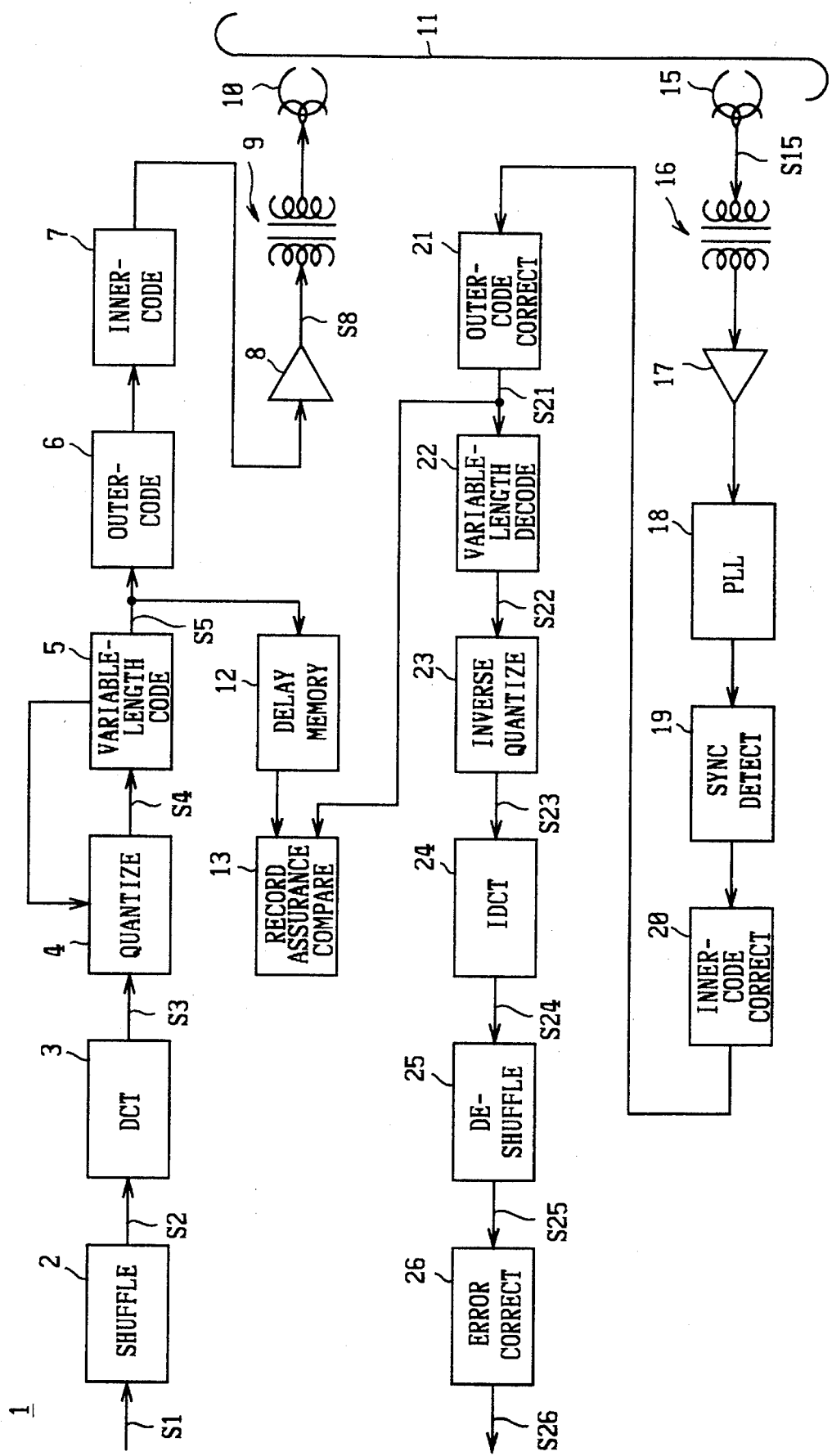
FIG. 1 is a block diagram illustrating a conventional recording and reproducing apparatus.
Figure 4:
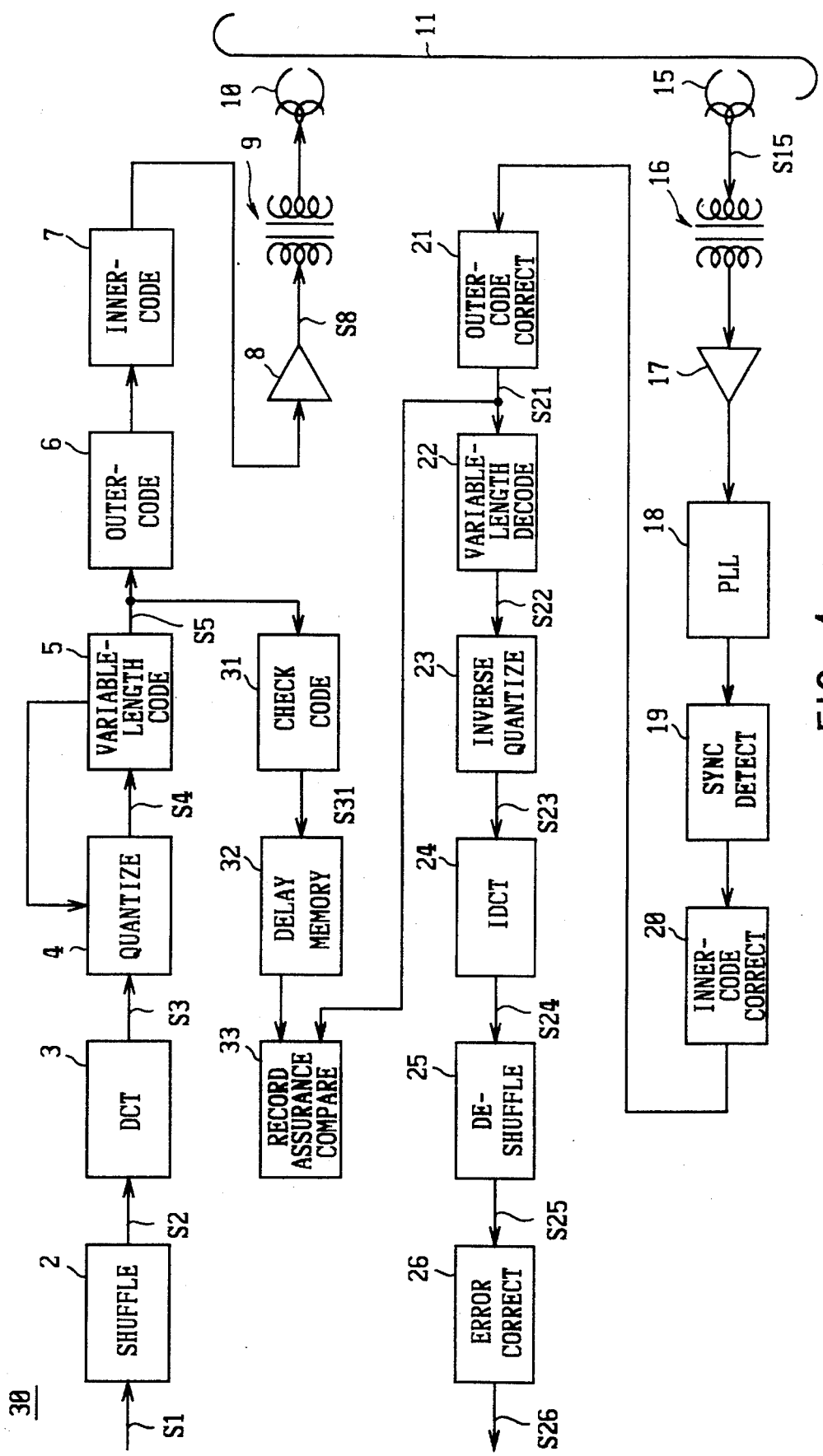
FIG. 4 is a block diagram showing an embodiment of a recording and reproducing apparatus according to this invention.

Preferred embodiments of this invention will be described with reference to the accompanying drawings:

In the DVTR 30 in FIG. 4, which gives the same numerals as those in FIG. 1 for the corresponding sections, in the recording system, the variable-length coding data S5 outputted from a variable-length coding circuit 5 is inputted to a check code circuit 31, the variable-length coding data S5 variable-length coded in units of DCT block is converted into 8-bit CRCC (cyclic redundancy check code) for each variable-length coded data block unit, and CRCC data S31 is transmitted to a delay memory 32.

The delay memory 32 delays the CRCC data S31 for the portion of delay time which is required for the signal processing from the error correction outer-coding circuit 6 in the recording system to the outer-code correction circuit 21 in the reproducing system, and transmits it to a record assurance comparator 33.

Moreover, in the record assurance comparator 33, the correcting data S21 outputted from the outer-code correction circuit 21 in the reproducing system is inputted, and 8-bit CRCC is calculated from the correcting data S21 in data block units.

In this way, in the record assurance comparator 33, the CRCC data S31 which is calculated based on the variable-length coding data S5 is compared with the CRCC data which is calculated based on the correcting data S21 in which the above variable-length coding data S5 is recorded on, and reproduced simultaneously from, the magnetic tape 11 and output from the outer-code correction circuit 21. Here, if the recording and reproducing systems operate normally and an error which exceeds the error correction limit of the error correction codes is not generated in the corrected data S21, the CRCC data S31 which is calculated from the variable-length coded data S5 and the CRCC data which is calculated from the corrected data S21 will be the same.

Therefore, the record assurance comparator 33 can assure recording by comparing the CRCC data S31 which is calculated from the variable-length coded data S5 with the CRCC data which is calculated from the corrected data S21 one by one. The states of the operations in the recording and reproducing systems are checked, and if no abnormality occurs in the result of check, the recording operation is continued.

Figure 5:
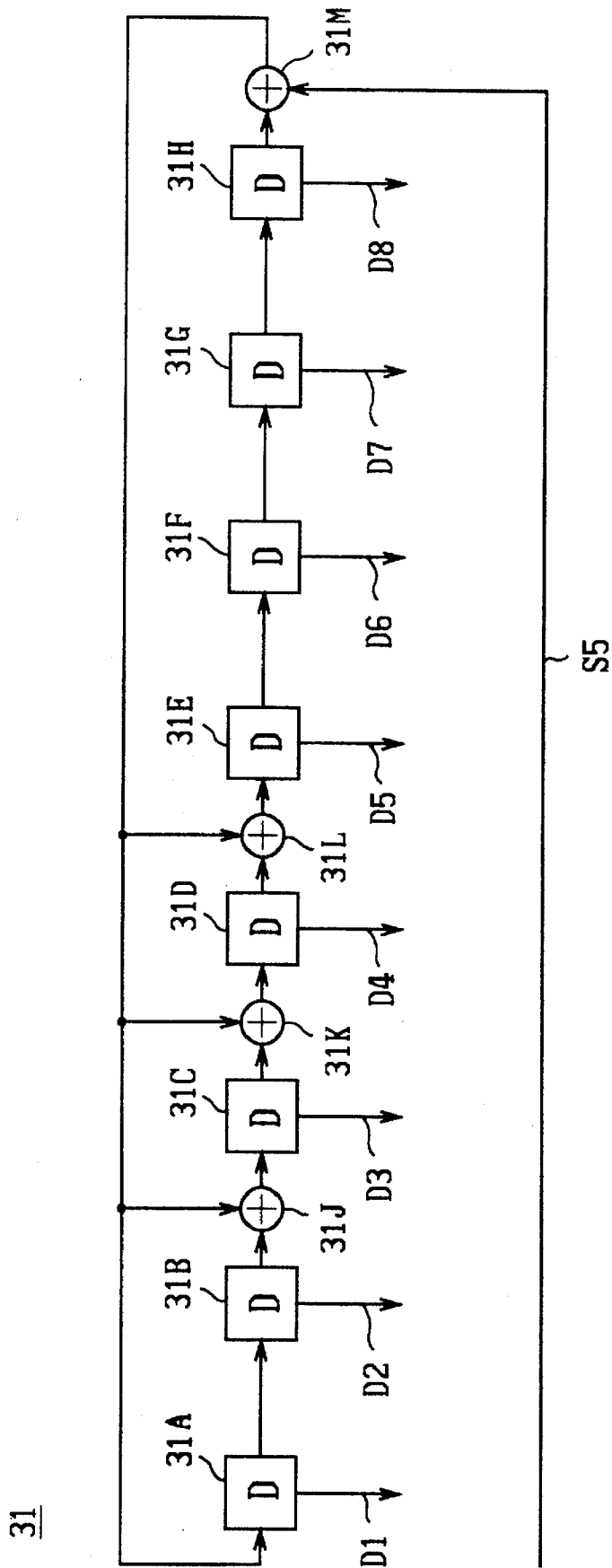
FIG. 5 is a block diagram illustrating the construction of a check code circuit.

Here, FIG. 5 shows the construction of the check code circuit 31. The check code circuit 31 consists of 8-bit registers 31A to 31H and exclusive-OR gates 31J, 31K, 31L, and 31M. The variable-length coded data S5 which is obtained in data block units is inputted to the exclusive-OR gate 31M, and the exclusive-OR with the output of the register 31H is then operated. The result of the operation is inputted to the register 31A and the exclusive-OR gates 31J, 31K, and 31L, respectively.

The register 31A transmits the output of the exclusive-OR gate 31M to the register 31B by delaying it for a predetermined period of time. The register 31B transmits this to the exclusive-OR gate 31J by further delaying it for a predetermined period of time. The exclusive-OR gate 31J operates the exclusive-OR on the outputs of the register 31B and the exclusive-OR gate 31M, and transmits the result of the operation to the register 31C. The register 31C delays the output of the exclusive-OR gate 31J for a predetermined period of time and transmits this to the exclusive-OR gate 31K. The exclusive-OR gate 31K operates on the outputs of the register 31C and the exclusive-OR gate 31M and transmits the result of the operation to the register 31D.

Moreover, the register 31D delays the output of the exclusive-OR gate 31K for a predetermined period of time and transmits this to the exclusive-OR gate 31L. The exclusive-OR gate 31L operates on the exclusive-OR of the outputs of the register 31D and the exclusive-OR gate 31M and transmits the result of the operation to the register 31E. The register 31E delays the output of the exclusive-OR gate 31L for a predetermined period of time and transmits this to the register 31F. The register 31F delays the output of the register 31E for a predetermined period of time and transmits this to the register 31G. The register 31G delays the output of the register 31F for a predetermined period of time and transmits this to the register 31H. The register 31H delays the output of the register 31G for a predetermined period of time and transmits this to the exclusive-OR gate 31M.

In this way, the output data D1 to D8 are obtained from the 8-bit registers 31A to 31H respectively, and the 8-bit CRCC data S31 is generated for each data block from the output data D1 to D8.

Moreover, in the record assurance comparator 33, the calculation circuit of the CRCC data is constructed similarly to the circuit shown in FIG. 5 on the basis of the corrected data S21 inputted from the outer-code correction circuit 21.

In the above construction, in the DVTR 30, the delay memory 32 delays the 8-bit CRCC data S31 for the data in units of each data block by replacing the variable-length coded data S5 in units of data block, which is output from the variable-length coding circuit 5, with the 8-bit CRCC data S31 in the check code circuit 31.

Therefore, even in cases where several fields are needed as a delay time required for the signal processing from the error correction outer-coding circuit 6 in the recording system to the outer-code correction circuit 21 in the reproducing system, the capacity of the delay memory 32 can be made considerably smaller by inputting the variable-length coded data S5 having a large amount of information volume and replacing it with the CRCC data S31 having less information volume in the check code circuit 31.

In the above construction, when recording assurance is conducted by comparing the recording data with the reproducing data, the volume of the information to be transmitted can be reduced considerably by replacing the variable-length coded data S5 to be transmitted from the recording system to the reproducing system with the CRCC data S31. Therefore, in the delay memory 32, the capacity can be reduced with the equal functions remained.

Moreover, the check code circuit 31 is built in the signal processing IC on the recording side as well as the delay memory 32 and the record assurance comparator 33 are built in the signal processing IC on the reproducing side, thereby allowing the number of parts to be reduced considerably and the board area to be made small.

Furthermore, in case where the CRCC data S31 is transmitted to the record assurance comparator 33, the 8-bit data needs to be sent for each data block. Therefore, the CRCC data S31 can be transmitted at a sufficiently slow speed even if the number of the transmission lines is one. Since the number of transmission lines is reduced, the probability of the occurrence of wire breakage, etc., can be reduced considerably.

Figure 6:
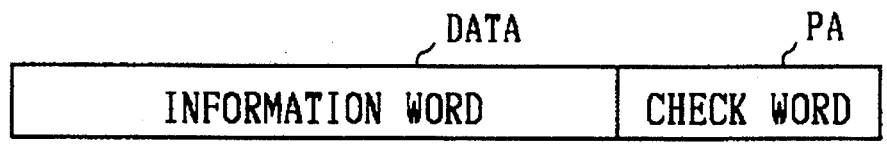
FIG. 6 is a schematic diagram illustrating the configuration of an error detection code block.

Moreover, in the embodiments described above, the CRCC data S31 is calculated to transmit to the record assurance comparator 33. However, this invention is not only limited to this, but it may be an error correction code, or sum check, etc. That is, it can be an error detection code of a structure in which a check word PA is added to an information word DATA, such as shown in FIG. 6.

Figure 7:
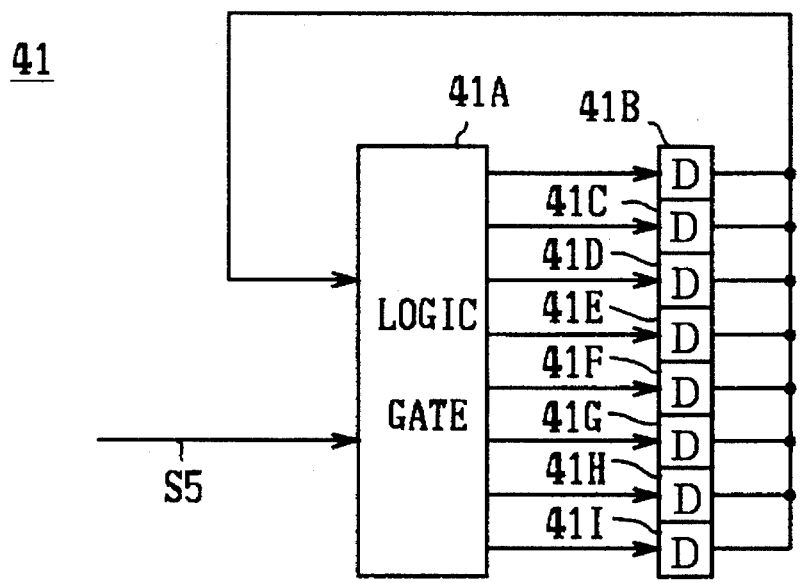
FIG. 7 is a block diagram illustrating another embodiment of the check code circuit.

Moreover, in the embodiments described above, a CRCC arithmetic circuit of a serial circuit structure, as shown in FIG. 5, is used as a check code circuit 31. However, this invention is not only limited to this, but, for example, it may be used that a CRCC arithmetic circuit 41 with parallel circuit structure which is constituted of a logic gate circuit 41A consisting of 8-bit registers 41B to 41I and tens of exclusive-OR gates, as shown in FIG. 7.

Moreover, in the embodiments described above, the 8-bit CRCC data S31 is generated for each data block. However, this invention is not only limited to this, but various kinds of information word lengths and check word lengths may be used as a check code according to the circuit scale, etc..

Moreover, in the embodiments described above, the invention is applied to a DVTR which records the input digital video signal by executing DCT transform, quantizing, and variable-length coding. However, this invention is not only limited to this, but may be widely and advantageously applied to a recording and reproducing apparatus of various different kinds of structures.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. Apparatus for recording and reproducing data comprising:

input means for receiving an input data signal;

compression means, coupled to said input means, for compressing said input data signal to produce a compressed signal;

first check means for generating a first check code as a function of said compressed signal;

recording and reproducing means for recording said compressed signal upon a medium and for reproducing from said medium a reproduced compressed signal;

second check means for generating a second check code as a function of said reproduced compressed signal;

comparator means for comparing said first check code with said second check code to verify an operation of said recording and reproducing means.

2. Apparatus according to claim 1, further comprising delay means, coupled to said first check means and to said comparator means, for delaying a transmission of said first check code to said comparator means.

3. Apparatus according to claim 2, wherein said delay means comprises a memory.

4. Apparatus according to claim 1, wherein said first Check code and said second check code are cyclic redundancy check codes.

5. Apparatus according to claim 1, wherein said compression means comprises quantizing means and variable length coding means.

* * * * *